United States Patent
Johnson et al.

(10) Patent No.: US 9,253,031 B2
(45) Date of Patent: Feb. 2, 2016

(54) SYSTEM, METHOD AND COMPUTER PROGRAM PRODUCT FOR IDENTIFYING, CONFIGURING AND ACCESSING A DEVICE ON A NETWORK

(71) Applicant: Weaved, Inc., Palo Alto, CA (US)

(72) Inventors: Michael W. Johnson, Petaluma, CA (US); Ryo Koyama, Palo Alto, CA (US)

(73) Assignee: Weaved, Inc., Palo Alto, CA (US)

(*) Notice: Subject to any disclaimer, the term of this patent is extended or adjusted under 35 U.S.C. 154(b) by 0 days.

(21) Appl. No.: 13/865,910

(22) Filed: Apr. 18, 2013

(65) Prior Publication Data

US 2013/0232243 A1 Sep. 5, 2013

Related U.S. Application Data

(63) Continuation of application No. 11/860,876, filed on Sep. 25, 2007, now Pat. No. 8,447,843.

(60) Provisional application No. 60/883,637, filed on Jan. 5, 2007, provisional application No. 60/826,887, filed on Sep. 25, 2006.

(51) Int. Cl.
| | |
|---|---|
| *G06F 15/177* | (2006.01) |
| *H04L 12/24* | (2006.01) |
| *G06Q 10/10* | (2012.01) |
| *H04L 29/06* | (2006.01) |
| *H04L 29/08* | (2006.01) |
| *H01L 29/12* | (2006.01) |

(52) U.S. Cl.
CPC .......... *H04L 41/0803* (2013.01); *G06Q 10/103* (2013.01); *H04L 63/105* (2013.01); *H04L 67/125* (2013.01); *H04L 67/34* (2013.01); *H01L 29/12* (2013.01); *H04L 67/025* (2013.01)

(58) Field of Classification Search
USPC .......................................................... 709/220
See application file for complete search history.

(56) References Cited

U.S. PATENT DOCUMENTS

| | | |
|---|---|---|
| 5,787,246 A | 7/1998 | Lichtman et al. |
| 5,887,139 A | 3/1999 | Madison, Jr. et al. |
| 6,012,088 A * | 1/2000 | Li et al. .......................... 709/219 |
| 6,028,848 A | 2/2000 | Bhatia et al. |
| 6,073,172 A * | 6/2000 | Frailong et al. ............... 709/222 |
| 6,393,484 B1 | 5/2002 | Massarani |
| 6,429,893 B1 | 8/2002 | Xin |
| 6,601,093 B1 * | 7/2003 | Peters ........................... 709/220 |
| 6,647,389 B1 | 11/2003 | Fitch et al. |
| 6,686,838 B1 | 2/2004 | Rezvani et al. |
| 6,735,619 B1 * | 5/2004 | Sawada .......................... 709/212 |
| 6,938,089 B1 | 8/2005 | Slaby et al. |

(Continued)

OTHER PUBLICATIONS

Document, titled "Role Based Access Control" by Michael Lebkicher, (hereinafter Lebkicher), Nov. 30, 2000, pp. 1-12 (which contain pp. 164-172), Copyright SANS Institute.*

(Continued)

*Primary Examiner* — Viet Vu
*Assistant Examiner* — James Edwards
(74) *Attorney, Agent, or Firm* — Zilka-Kotab, PC

(57) ABSTRACT

A system, method, and computer program product are provided for identifying, configuring, and accessing a device connected to a network. In operation, a device connected to a network is automatically identified. Additionally, the device is automatically configured. Strictly as an option, the device may be accessed on the network.

16 Claims, 16 Drawing Sheets

(56) References Cited

U.S. PATENT DOCUMENTS

| | | | |
|---|---|---|---|
| 6,943,681 B2 | 9/2005 | Rezvani et al. | |
| 7,079,520 B2 | 7/2006 | Feige et al. | |
| 7,240,106 B2 | 7/2007 | Cochran et al. | |
| 7,250,854 B2 | 7/2007 | Rezvani et al. | |
| 7,315,886 B1* | 1/2008 | Meenan et al. | 709/219 |
| 7,412,542 B1* | 8/2008 | Newson et al. | 709/249 |
| 7,558,862 B1 | 7/2009 | Tyukasz et al. | |
| 7,609,721 B2 | 10/2009 | Rao et al. | |
| 7,774,437 B2* | 8/2010 | Crosier et al. | 709/220 |
| 7,796,023 B2 | 9/2010 | Rezvani et al. | |
| 7,808,906 B2 | 10/2010 | Rao et al. | |
| 7,912,046 B2 | 3/2011 | Li et al. | |
| 7,992,209 B1 | 8/2011 | Menoher et al. | |
| 8,014,421 B2 | 9/2011 | Rao et al. | |
| 8,046,830 B2 | 10/2011 | Rao et al. | |
| 8,065,418 B1 | 11/2011 | Abuan et al. | |
| 8,086,740 B2 | 12/2011 | Tyukasz et al. | |
| 8,149,851 B2 | 4/2012 | Asnis et al. | |
| 8,208,413 B1 | 6/2012 | Bienn et al. | |
| 8,266,689 B2 | 9/2012 | Menoher et al. | |
| 8,296,437 B2 | 10/2012 | Pankratov | |
| 8,351,333 B2 | 1/2013 | Rao et al. | |
| 8,353,022 B1 | 1/2013 | Menoher et al. | |
| 8,358,635 B2 | 1/2013 | Feige et al. | |
| 8,447,843 B2 | 5/2013 | Johnson et al. | |
| 8,526,405 B2 | 9/2013 | Curtis et al. | |
| 8,627,424 B1 | 1/2014 | O'Malley et al. | |
| 8,634,420 B2 | 1/2014 | Rao et al. | |
| 8,723,664 B2 | 5/2014 | Rezvani et al. | |
| 8,831,222 B2 | 9/2014 | Menoher et al. | |
| 8,898,227 B1 | 11/2014 | Mraz et al. | |
| 2002/0091791 A1 | 7/2002 | Kang | |
| 2002/0143984 A1 | 10/2002 | Hudson Michel | |
| 2003/0040937 A1 | 2/2003 | Gregersen et al. | |
| 2003/0065947 A1 | 4/2003 | Song et al. | |
| 2004/0054925 A1* | 3/2004 | Etheridge et al. | 713/201 |
| 2004/0059821 A1 | 3/2004 | Tang et al. | |
| 2004/0098507 A1* | 5/2004 | Thubert et al. | 709/245 |
| 2004/0133689 A1* | 7/2004 | Vasisht | 709/228 |
| 2004/0172396 A1* | 9/2004 | Vanska et al. | 707/9 |
| 2004/0199615 A1* | 10/2004 | Philyaw | 709/220 |
| 2005/0063357 A1* | 3/2005 | Wewalaarachchi et al. | 370/352 |
| 2005/0114492 A1* | 5/2005 | Arberg et al. | 709/223 |
| 2005/0229238 A1* | 10/2005 | Ollis et al. | 726/4 |
| 2005/0249196 A1* | 11/2005 | Ansari et al. | 370/352 |
| 2006/0039356 A1 | 2/2006 | Rao et al. | |
| 2006/0120305 A1* | 6/2006 | Van Den Bosch et al. | 370/254 |
| 2006/0155833 A1* | 7/2006 | Matsuda et al. | 709/220 |
| 2006/0168022 A1* | 7/2006 | Levin et al. | 709/206 |
| 2006/0174120 A1 | 8/2006 | Rippy et al. | |
| 2006/0288071 A1* | 12/2006 | Bigioi et al. | 709/203 |
| 2007/0022185 A1* | 1/2007 | Hamilton et al. | 709/220 |
| 2007/0067431 A1* | 3/2007 | Yoshihara et al. | 709/223 |
| 2007/0201622 A1* | 8/2007 | Croak et al. | 379/37 |
| 2008/0046735 A1* | 2/2008 | Nedeltchev et al. | 713/173 |
| 2008/0275997 A1 | 11/2008 | Gavin et al. | |
| 2010/0146110 A1 | 6/2010 | Christensen et al. | |
| 2011/0055322 A1 | 3/2011 | Gregersen | |
| 2011/0252116 A1 | 10/2011 | Menoher et al. | |
| 2011/0307263 A1 | 12/2011 | Bader et al. | |
| 2012/0117649 A1 | 5/2012 | Holloway et al. | |
| 2012/0137213 A1 | 5/2012 | Hayler et al. | |
| 2012/0254976 A1* | 10/2012 | Armstrong et al. | 726/11 |
| 2012/0331097 A1 | 12/2012 | Menoher et al. | |
| 2013/0097283 A1 | 4/2013 | Menoher et al. | |
| 2013/0339509 A1 | 12/2013 | Johnson et al. | |
| 2014/0337407 A1 | 11/2014 | Mraz et al. | |
| 2015/0052253 A1 | 2/2015 | Johnson et al. | |
| 2015/0052258 A1 | 2/2015 | Johnson et al. | |
| 2015/0088982 A1 | 3/2015 | Johnson et al. | |
| 2015/0113172 A1 | 4/2015 | Johnson et al. | |

OTHER PUBLICATIONS

Finch, https://meetfinch.com/docs/faq, 'Frequently Asked Questions', Finch.com, Nov. 2, 2014, pp. 1-11.
https://github.com/progrium/localtunnel, 'progrium/localtunnel', GitHub.com, 2013, Code Version 182, Latest Commit: 08f3ac0f15, Nov. 21, 2013, pp. 1-2.
Levkowetz et al., 'Mobile IP Traversal of Network Address Translation (NAT) Devices', The Internet Society, Apr. 2003, pp. 17-34.
Rosenberg et al., 'STUN—Simple Traversal of User Datagram Protocol (UDP) Through Network Address Translators (NATs)', The Internet Society, 2003, pp. 31-44.
Rosenberg et al., 'Session Traversal Utilities for NAT (STUN)', IEEE, Oct. 2008, pp. 1-17.
Rosenberg et al., 'Interactive Connectivity Establishment (ICE): A Protocol for Network Address Translator (NAT) Traversal for Offer/Answer Protocols', Internet Engineering Task Force, Feb. 25, 2013, pp. 1-20.
http://stackoverflow.com/questions/7621341/how-can-i-programmatically-generate-heroku-like-subdomain-names, 'How can I programmatically generate Heroku-like subdomain names?', Stackoverflow.com, Sep. 8, 2011, pp. 1-2.
Tsai, 'A Study of P2P Traversal Through Symmetric Nat' VDM Publishing, 2010, pp. 1-76.
https://news.ycombinator.com/item?id=7585056, Localtunnel.me, Ycombinator.com, Nov. 2, 2014, pp. 1-6.
https://news.ycombinator.com/item?id=7763688, 'Finch-local port forwarding', Ycombinator.com, Nov. 2, 2014, pp. 1-7.
Cantanzariti, 'Accessing localhost From Anywhere', sitepoint.com, Mar. 14, 2014, pp. 1-15.
Eppinger et al. 'TCP Connections for P2P Apps: A Software Approach to Solving the NAT Problem', Institute for Software Research, 2005, pp. 1-8.
Ford et al., 'Peer-to-Peer Communication Across Network Address Translators', USENIX Association, 2005, pp. 179-192.
Guha et al., 'Characterization and Measurement of TCP Traversal through NATs and firewalls', USENIX Association, 2005, pp. 199-211.
Hao et al., 'Network address translation traversal based on Bernoulli laws of large number in P2P streaming system', High Technology Letters, vol. 17, No. 4, Dec. 2011, pp. 401-406.
Ho et al., 'NAT-Compatibility Testbed: An Environment to Automatically Verify Direct Connection Rate', IEEE, vol. 15, Issue 1, Jan. 13, 2011, pp. 4-6.
Ho et al., 'To Call or to Be Called Behind NATs is Sensitive in Solving the Direct Connection Problem', IEEE, vol. 15, No. 1, Jan. 2011, pp. 94-96.
Huang et al., 'Smart Tunnel Union for NAT Traversal', IEEE, 2005, pp. 1-4.
Lindsay, 'Localtunnel Protocol', GitHub.com, 2012, pp. 1-3.
Lindsay, 'Where did Localtunnel come from?', Progrium.com, 2014, pp. 1-3.
Microsoft, 'Teredo Overview', Microsoft, Jan. 15, 2007, pp. 1-18.
Muller et al., 'Behavior and Classification of NAT devices and implications for NAT Traversal', IEEE Network Special Issue on Implications and Control of Middleboxes, Oct. 2008, pp. 1-6.
Muller et al., 'On the Applicability of knowledge based NAT-Traversal for Home Networks', 2008, pp. 1-12.
Muller et al., 'Autonomous NAT Traversal', IEEE, pp. 1-4.
https://pagekite.net/wiki/Floss/PageKiteProtocol/, 'The PageKite Protocol', PageKite.net, Mar. 17, 2011, pp. 1-12.
International Search Report and Written Opinion of PCT Application No. PCT/US2007/20750, dated Mar. 7, 2008, 7 pages total.
International Preliminary Report of PCT Application No. PCT/US2007/20750, dated Oct. 24, 2008, 6 pages total.
Perreault et al., 'Traversal Using Relays around NAT (TURN) Extensions for TCP Allocations', Internet Engineering Task Force (IETF), Nov. 2010, pp. 1-13.
Rosenberg et al., 'Traversal Using Relays around NAT (TURN) Extensions for TCP Allocations', Nov. 2010, pp. 1-13.
Savin, 'Digging Tunnels', red-badger.com, May 12, 2014, pp. 1-7.
Sheehan, 'A Survey of the Localhost Proxying Landscape', johnsheehan.com, Aug. 5, 2013, pp. 1-4.
Shreve, 'ngrok tunnels: better, faster, stronger', inconshreveable.com, Sep. 25, 2013, pp. 1-7.
Stiemerling et al., 'NAT and Firewall Traversal Issues of Host Identity Protocol (HIP) Communication', Apr. 2008, pp. 1-13.

(56) References Cited

OTHER PUBLICATIONS

Tamberg, 'Yaler Protocol Documentation', Yaler.net, Sep. 11, 2012, pp. 1-5.
Wacker et al., 'A NAT Traversal Mechanism for Peer-To-Peer Networks', IEEE, Sep. 8, 2008, pp. 81-83.
Wang et al., 'Research on Symmetric NAT Traversal in P2P applications', Computing in the Global Information Technology, Aug. 2006, pp. 1-6.
Xu et al., 'Research and implementation of P2P communications scheme based on NAT-traversal technologies' (English Abstract Only), Computer Engineering and Design, vol. 28, No. 7, Apr. 2007, pp. 1559-1603.
Yoshimi et al., 'NAT Traversal Technology of Reducing Load on Relaying Server for P2P Connections', Consumer Communications and Networking Conference, Jan. 2007, pp. 100-104.
USPTO Office Action for U.S. Appl. No. 11/860,876 dated Nov. 3, 2009 (18 pages).
USPTO Office Action for U.S. Appl. No. 11/860,876 dated May 12, 2010 (24 pages).
USPTO Office Action for U.S. Appl. No. 11/860,876 dated Aug. 14, 2012 (33 pages).
USPTO Notice of Allowance for U.S. Appl. No. 11/860,876 dated Jan. 18, 2013 (12 pages).
International Preliminary Report & Written Opinion of PCT Application No. PCT/US2013/046004, dated Jan. 10, 2014, 7 pages total.
USPTO Office Action for U.S. Appl. No. 13/918,773 dated Jun. 18, 2015 (17 pages).
USPTO Notice of Allowance for U.S. Appl. No. 14/589,951 dated May 22, 2015 (12 Pages).
Finch, https:/lmeetfinch.com/docs/faq, 'Frequently Asked Questions', Finch.com, Nov. 2, 2014, pp. 1-11.
https://github.com/progrium/localtunnel, 'progrium/localtunnel', GitHub.com, 2013, Code Version 182, Latest Commit: 08f3ac0f15, Nov. 21, 2013, pp. 1-2.
Levkowetz et al., 'Mobile Ip Traversal of Network Address Translation (Nat) Devices', the Internet Society, Apr. 2003, pp. 1-16.
Levkowetz et al., 'Mobile Ip Traversal of Network Address Translation (Nat) Devices', the Internet Society, Apr. 2003, pp. 17-34.
Rosenberg et al., 'Stun- Simple Traversal of User Datagram Protocol (Udp) Through Network Address Translators (NATs)', the Internet Society, 2003, pp. 1-15.
Rosenberg et al., 'Stun- Simple Traversal of User Datagram Protocol (Udp) Through Network Address Translators (NATs)', the Internet Society, 2003, pp. 16-30.
Rosenberg et al., 'Stun- Simple Traversal of User Datagram Protocol (Udp) Through Network Address Translators (NATs)', the Internet Society, 2003, pp. 31-44.
Rosenberg et al., 'Session Traversal Utilities for Nat (Stun)', IEEE, Oct. 2008, pp. 1-17.
Rosenberg et al., 'Session Traversal Utilities for Nat (Stun)', IEEE, Oct. 2008, pp. 18-34.
Rosenberg et al., 'Session Traversal Utilities for Nat (Stun)', IEEE, Oct. 2008, pp. 35-51.
Rosenberg et al., 'Interactive Connectivity Establishment (Ice): a Protocol for Network Address Translator (Nat) Traversal for Offer/Answer Protocols', Internet Engineering Task Force, Feb. 25, 2013, pp. 1-20.
Rosenberg et al., 'Interactive Connectivity Establishment (Ice): a Protocol for Network Address Translator (Nat) Traversal for Offer/Answer Protocols', Internet Engineering Task Force, Feb. 25, 2013, pp. 21-40.
Rosenberg et al., 'Interactive Connectivity Establishment (Ice): a Protocol for Network Address Translator (Nat) Traversal for Offer/Answer Protocols', Internet Engineering Task Force, Feb. 25, 2013, pp. 41-60.
Rosenberg et al., 'Interactive Connectivity Establishment (Ice): a Protocol for Network Address Translator (Nat) Traversal for Offer/Answer Protocols', Internet Engineering Task Force, Feb. 25, 2013, pp. 61-80.
Rosenberg et al., 'Interactive Connectivity Establishment (Ice): a Protocol for Network Address Translator (Nat) Traversal for Offer/Answer Protocols', Internet Engineering Task Force, Feb. 25, 2013, pp. 81-89.
http://stackoverflow.comiquestionsf7621341/how-can-i-programmatically-generate-heroku-like-subdomain-names, 'How can I programmatically generate Heroku-like subdomain names?', Stackoverflow.com, Sep. 8, 2011, pp. 1-2.
Tsai, 'A Study of P2P Traversal Through Symmetric Nat' Vdm Publishing, 2010, pp. 1-76.
https://news.ycombinator.com/item?id=7585056, 'Localtunnel.me, Ycombinator.com, Nov. 2, 2014, pp. 1-6.
https://news.ycombinator.com/item?id=7763688, 'Finch-local port forwarding', Ycombinator.com, Nov. 2, 2014, pp. 1-7.

* cited by examiner

SYSTEM, METHOD AND COMPUTER PROGRAM PRODUCT FOR IDENTIFYING, CONFIGURING AND ACCESSING A DEVICE ON A NETWORK

RELATED APPLICATION(S)

The present application is a continuation of U.S. application Ser. No. 11/860,876, filed Sep. 25, 2007, which claims priority to U.S. Provisional Application No. 60/826,887, filed Sep. 25, 2006, and U.S. Provisional Application No. 60/883,637, filed Jan. 5, 2007, which are incorporated herein by reference in its entirety for all purposes.

BACKGROUND AND FIELD OF THE INVENTION

The present invention relates to networked devices, and more particularly to automatic configuration, identification and access of devices on a network.

SUMMARY

A system, method, and computer program product are provided for identifying, configuring, and accessing a device connected to a network. In operation, a device connected to a network is automatically identified. Additionally, the device is automatically configured. Strictly as an option, the device may be accessed on the network.

DETAILED DESCRIPTION

Figure 1:
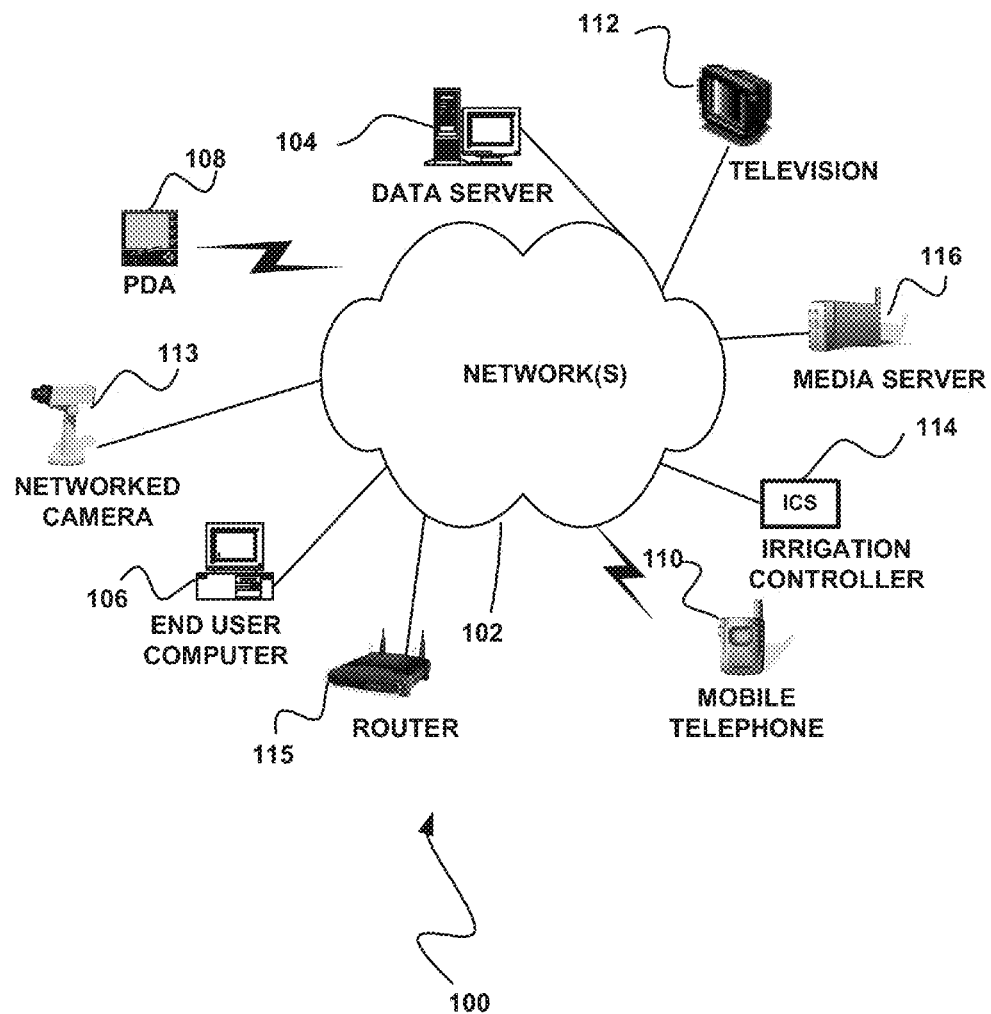
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Further, each of these computers can host independent virtual computers or services, which may operate as independent capabilities, each uniquely connected to the network. Still yet, various other devices may be coupled to the network 102 including a personal digital assistant (PDA) device 108, a mobile phone device 110, a television 112, a networked camera 113, an irrigation controller 114, a network router 115, a media server, 116, etc. Additionally, devices may be coupled to the network via a separate network. These separate networks could feature the same protocols as the main network, 102, or be managed under an entirely different set of parameters where some intermediary device serves to translate the protocols between the two networks.

Figure 2:
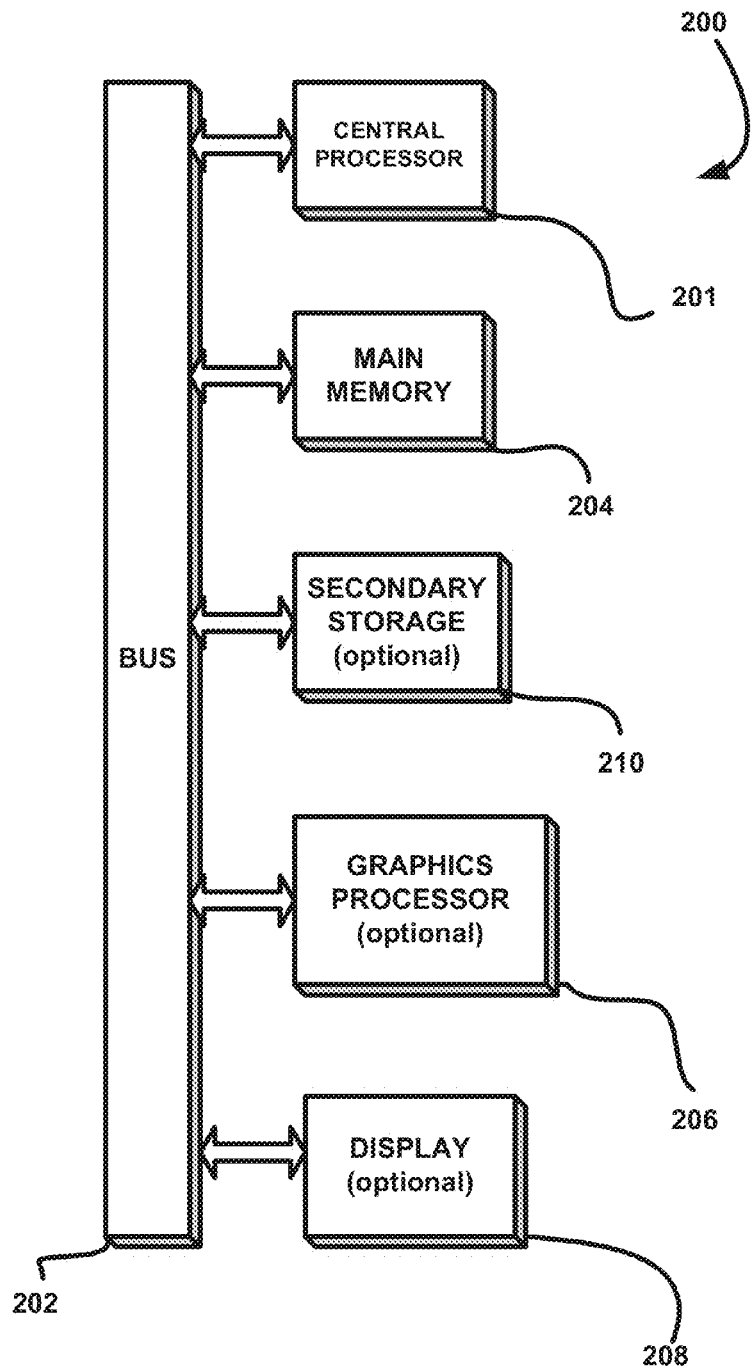
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also may include a graphics processor 206 and/or a display 208. It should be noted that the single shared communication bus depicted is simply for illustrative purposes, and the various elements could communicate with the central processor or with other elements across dedicated buses.

The computer system 200 may also include a secondary storage 210. The secondary storage 210 includes, for example, a hard disk drive and/or a removable storage drive, representing a floppy disk drive, a magnetic tape drive, a compact disk drive, memory cards, devices with storage (e.g. MP3 players, digital cameras) etc. The removable storage drive reads from and/or writes to a removable storage unit in a well-known manner.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media.

Figure 3:
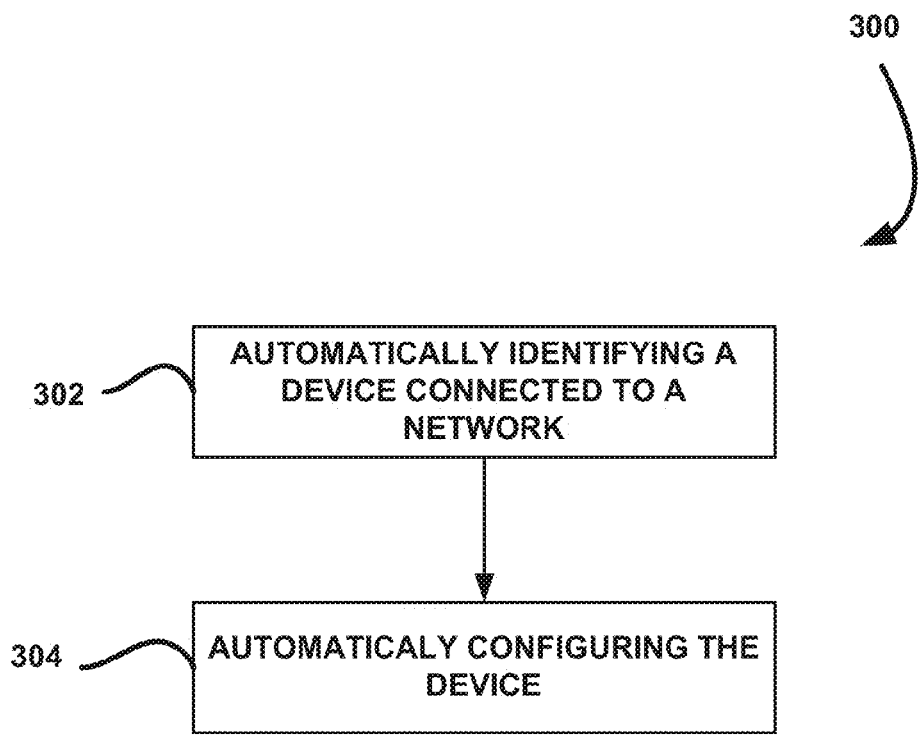
FIG. 3 shows a method for automatically configuring a device connected to a network, in accordance with one embodiment.

FIG. 3 shows a method 300 for automatically configuring a device connected to a network, in accordance with one embodiment. As an option, the method 300 may be implemented in the context of the architecture and environment of FIGS. 1 and/or 2. Of course, however, the method 300 may be carried out in any desired environment.

As shown, a device connected to a network is automatically identified. See operation 302. Additionally, the device is automatically configured. See operation 304.

In the context of the present description, a device refers to any device capable of being connected to a network. For example, in various embodiments, the device may include, but is not limited to, a PDA, a mobile phone, a television, a camera, an irrigation controller, a network router, a media server, a computer, and/or any other device that meets the above definition.

Furthermore, the configuration of the device may involve any type of configuration. For example, in one embodiment the configuration may include setting configurable parameters. In another embodiment, the configuration may include updating and/or installing software on the device.

Figure 4:
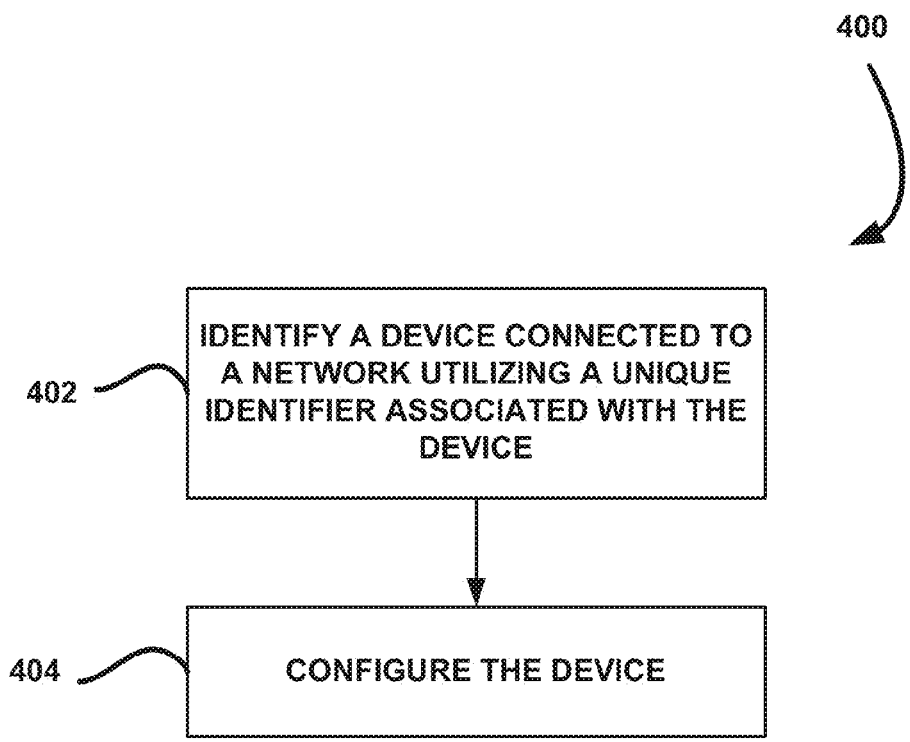
FIG. 4 shows a method or identifying a device on a network, in accordance with one embodiment.

FIG. 4 shows a method 400 for identifying a device on a network, in accordance with one embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown, a device connected to a network is identified utilizing a unique identifier associated with the device. See operation 402. In the context of the present description, a unique identifier (e.g. a UNIQUE ID, etc.) refers to any identifier that is unique to the device. For example, in various embodiments, the unique identifier may include, but is not limited to, a Media Access Control (MAC) address, a Universal Product Code (UPC), and/or any other identifier that meets the above definition.

Strictly as an option, the device may be associated with a Universal Device Locator (UDL). In this case, the UDL may include any term (e.g. familiar term, etc.) capable of being used for identification purposes. In one embodiment, such UDL may be associated with a service on the network.

For example, a UNIQUE ID of a device may be associated with a particular UDL, such that the UDL and derivatives of the UDL may be used by the service to access (e.g., locate, etc.) the device on the network. In yet another embodiment, the association of the device to the UDL may be utilized to establish a direct peer-to-peer network between the device and a remote device associated with the UDL.

Strictly as an option, the device may be configured once the device is identified. See operation 404. In one embodiment, the device may be automatically configured. In another embodiment, the device may be manually configured.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
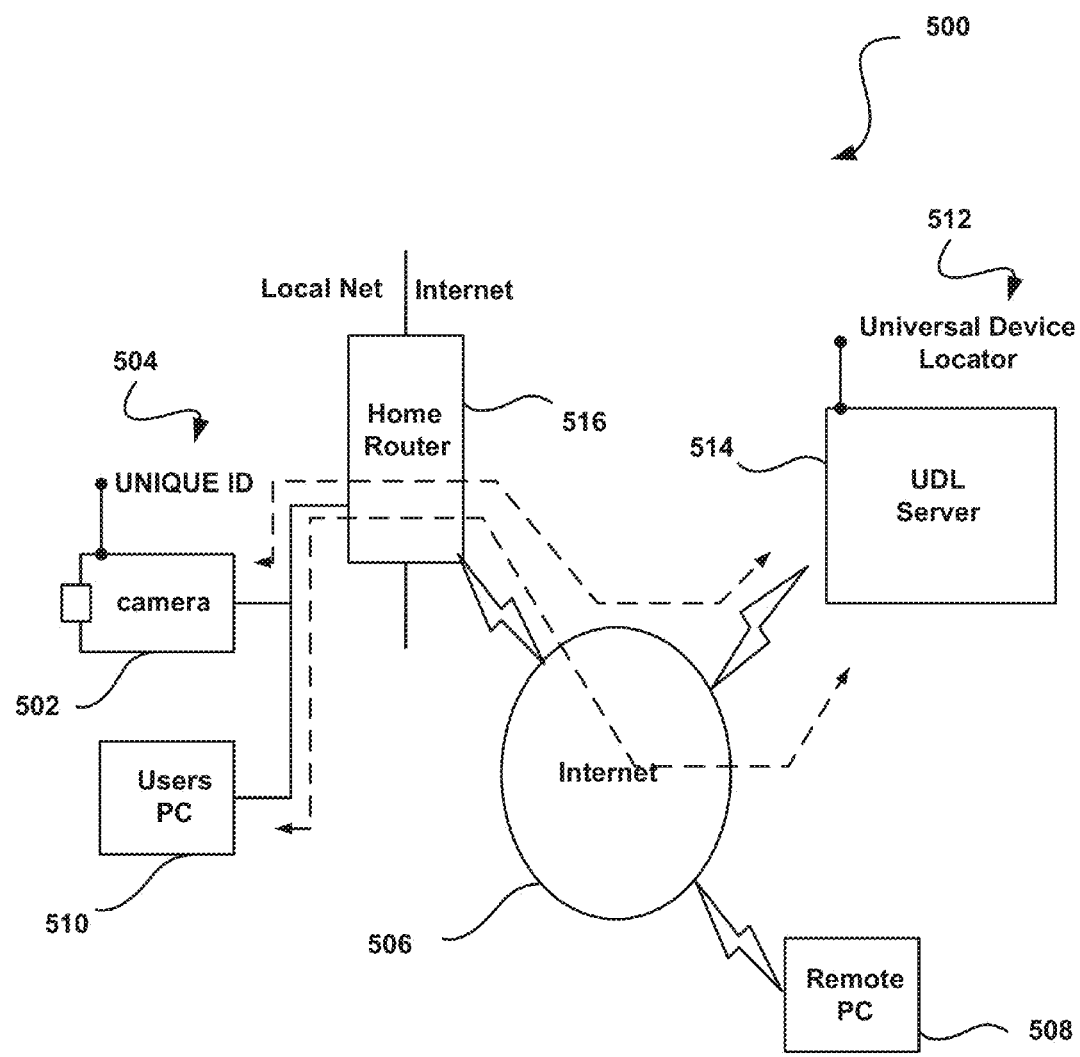
FIG. 5 shows a system for accessing a device on a network and/or automatically configuring a device connected to the network, in accordance with another embodiment.

FIG. 5 shows a system 500 for accessing a device on a network and/or automatically configuring a device connected to the network, in accordance with another embodiment. As an option, the system 500 may be implemented in the context of the architecture and environment of FIGS. 1-4. Of course, however, the system 500 may be implemented in any desired environment. It should also be noted that the aforementioned definitions may apply during the present description.

As shown, a device 502 may be identified utilizing a unique identifier 504 e.g., UNIQUE ID, etc.) associated therewith. The device 502 may include any of the devices described above with respect to FIGS. 1 and/or 2, and/or any other device capable of utilizing a network. As shown by way of example, the device 502 may include a camera connected to a network 506.

The UNIQUE ID 504 may include, for example, a MAC address (and/or may be derived from a MAC address), a universal product code UPC) number, and/or other type of unique identifier capable of guaranteeing the uniqueness of the ID across a plurality of different vendors (e.g. service providers, product providers, etc.). The device 502 may also be associated with a service having a particular Universal Device Locator (UDL) 512. In various embodiments, the UDL 512 may represent an individual, an entity (e.g. a company, vendor, etc.), etc. Accordingly, the service may be provided by such individual, entity, etc.

As an option, the device 502 may be associated with multiple UDLs 512, where each of the UDLs 512 represents various individuals or entities (e.g. user, manufacturer, software provider, reseller, etc.). In one embodiment, the device 502 may be associated with the UDL 512 by associating the UNIQUE ID 504 of the device 502 with the UDL 512. As shown, the UNIQUE ID 504 and the UDL 512 may be associated at a UDL server 514 (e.g. the association may be stored at the UDL server 514, etc.).

Further, if multiple UDLs 512 are associated with the device 502, a master UDL may optionally be identified (e.g. predetermined, etc.) which designates particular permissions for each of the UDLs 512 with respect to the device 502. In another embodiment, each UDL 512 may be designated as having authority over particular capabilities (e.g. functionality, etc.) of the device 502. By associating the device 502 with at least one UDL, 512, a user (e.g. owner, etc.) associated with the UDL 512 may access the device 502 over the network 506 (e.g. from a location remote from the device, etc.) utilizing the service providing the UDL 512. Accordingly, remote access to the capabilities of the device 502 may be disabled or severely limited if such association is broken (e.g. the UDL 512 is no longer associated with the device 502, etc.). As shown, the network 506 may include the Internet, but of course the network 506 may also include any of the networks described above with respect to FIG. 1.

In one embodiment, a user may access the device 502 from a remote personal computer (PC) 508 utilizing the association of the UDL 512 and the UNIQUE ID 504, as shown. For example, the User may login to the service (e.g. the service providing the UDL 512, etc.) for authenticating the user and for identifying any devices associated therewith. Optionally, the user may login utilizing a UDL 512. In addition, devices associated with the user's address (e.g. internet protocol (IP) address, etc.) may become accessible. In this way, a direct connection to the device 502 may be made remotely utilizing the association between the UDL 512 and UNIQUE ID 504.

As a specific example, a user may purchase a router 516 and configure the router for his/her home Internet connection. The user may also associate the MAC address of the router with an Internet service UDL 512. For illustrative purposes, the router 516 may be manufactured by Company A. As the master UDL holder, the user may grant the manufacturer (Company A) permission to provide any updates to the firmware of the router utilizing the UDL 512 associated with the router 516. In addition, the user may login anywhere he/she has access to an Internet connection and may establish a direct connection with the router 516 utilizing the associated 512.

Going further with the example, Company A may determine that it needs to provide a firmware update to the router 516. By logging into the Internet service providing the UDL 512, all devices that have been associated with such UDL 512 may become available and accordingly an automatic update to such devices may be allowed. Optionally, the user may grant the manufacture permission to access the router 516 on a case-by-case basis, such that Company A may send an alert to the router 516 for communicating with the user (e.g. the next time that the device owner logged into the service, etc.). The user may then determine whether or not to update the firmware of the router 516 based on the received alert.

In another exemplary embodiment, the user may be traveling internationally and may receive a call from home that there is a problem with the home Internet connection. In a situation where no one at home is knowledgeable enough to check the home router 516, the user may login to the Internet service capable of providing direct connection to the home router 516 and may select his/her home router 516. A browser application may then be launched and a user interface for the home router 516 may be made available to the user for remotely configuring the home router 516 as if he/she were accessing the router via the local network. For example, the user may reset the home router 516 and re-establish the Internet connection such that the home Internet connection is repaired.

In another exemplary embodiment, the owner of a network connected video camera 502 may select to make a UDL 512 associated with the camera 502 and any information associated therewith visible and searchable to anyone using the Internet service. For example, the device owner may be going on vacation and may ask another person (e.g. a neighbor, etc.) to monitor his/her camera 502 while he/she is away. The device owner may provide the other person with the UDL 512 associated with the device 502.

The neighbor may then login to the Internet service and conduct a search for devices associated with the UDL 512. Any devices associated with the UDL 512 may be presented and the neighbor may request and receive permission (e.g. temporary permission, permanent permission, etc.) from the device owner to view the network camera 502 over the network 506. The association of the UNIQUE ID 504, which in the present embodiment includes the MAC address of the device, with the UDL 512 may therefore allow for searching for and accessing remote devices via UDLs 512, such that a user attempting to access a remote device need not know or remember the UNIQUE ID 504 of the device 502 which may be a complex set of numbers that may not be easily remembered.

Furthermore, a browser plug in may be available for the Internet service, such that a user may use the "devicename@userID" as a UDL 512 to locate the device 502. In this scenario, the protocol type may be entered along with the UDL 512, similar to how Internet addresses may be entered. Table 1 illustrates an exemplary UDL 512 associated with a sample Internet Service that may be utilized for accessing the device 502. It should be noted that the UDL illustrated in Table 1 is for illustrative purposes only, and therefore should not be construed as limiting in any manner.

TABLE 1

Example: Service via Yoics
Current: http://www.yoics.com
Device: yoics://camera@jane_doe In a further embodiment, the association of the UDL 512 and the UNIQUE ID 504 of the device 502 may be utilized for tracking product ownership. For example, devices may automatically register when connected to a network and identify their location (e.g. IP address, etc.) to the Internet service. Thus, a purchaser of used goods may request that payment be automatically released upon transfer of the device to the new UDL associated with the purchaser. Thus, a transfer of an association between a device's UNIQUE ID 504 and/or UDL 512 and a user may be utilized for triggering a commerce/commercial transaction. In addition, the association of the UDL 512 and the UNIQUE ID 504 of the device 502 may also provide security for the device 502, such that unless the UDL 512 is fundamentally modified, the UDL 512 may remain associated with the current owner.

In still yet a further embodiment, the association between the UDL 512 and the UNIQUE ID 504 of the device 502 may also be used by a system integrator, reseller or manufacturer for configuring the device 502 for a customer. For example, the reseller may take ownership of the device 502 by associating a UDL 512 of the reseller with the device 502 and may further fully configure the device 502 for the customer. The reseller may then transfer ownership to a UDL 512 of the customer upon completing the configuration. This method of pre-configuration, could also be used as a mechanism for product registration. In addition, the customer may optionally have the ability to temporarily grant access permission in order to temporarily provide direct access to the device 502, thus facilitating on-going sessions of technical support.

In one embodiment, the device 502 connected to the network 506 may be automatically identified and, in turn, automatically configured. The automatic identification of un-configured devices may allow for the configuration of such devices on the network 506. Moreover, such configuration may be performed without knowledge of a local IP address associated with the device 502 which may be acquired over the network 506 via DHCP (Dynamic Host Configuration Protocol). Accordingly, a user may locate and configure the device 502 by simply connecting the device 502 to the network 506 and/or by connecting to a service provided by a service provider with any other device.

As an option, any un-configured device on the network 506 may be automatically detected, configured and linked to an account associated with the service. Once configured, a user may be able to reconfigure and update the device by connecting to the service and selecting the device to reconfigure or update. In addition, the service may also allow a connection to the configured device without the knowledge of an Internet Protocol (IP) address associated with the device.

Furthermore, a device class interface (e.g. user interface, etc.) may be configured or changed, thus allowing additional devices to connect and/or existing devices to be re-configured. For example, configurable information (e.g. attributes, etc.) of the device 502 may be abstracted into an interface associated with the service, or the interface associated with the service may be populated with configurable attributes of the device 502. A user may be able to configure the device 502 at the homepage of the service provider, and the device 502 may then be updated (e.g. based on user selections, etc.). The communication between the service and device 502 may consist of a protocol that can update configuration and memories of the device 502 at the request of a user or the associated service provider.

In one exemplary embodiment, a system that provides video cameras for monitoring purposes may allow a server associated with a service provider to automatically identify un-configured (e.g. unregistered, etc.) devices. A source IP address used to connect to the server may be detected. When a registered user (e.g. of the service) logs onto the server, a source IP address associated with such user may be logged. This source IP address could be either a static or dynamic, and does not have to remain constant with a user ID. Rather, the IP address for the user and the un-configured device would be associated on a login-session basis.

If an un-configured device is detected from the same source IP address as the logged source IP address, then it may be determined that the un-configured device belongs to the registered user. Specifically, such determination may be made on the basis that the un-configured device corresponds to the same source IP address. In a situation where a router utilizes Network Address Translation (NAT) to source all connections associated with a network, the device can enter the Auto Identification mode by pressing a button on the device or automatically when the un-configured device powers up, etc.

Automatic identification may therefore allow a user to find and configure the device 502 plugged into the network 506 without having to read complex instructions, change a configuring computer's network settings or install any software on a user computer 510. The user may simply plug in the device 502 and go to a service homepage, where the device 502 may automatically be displayed such that the user may configure the device 502. Once initialized to the user (e.g. registered to the user, etc.), the device 502 may be easily configured, updated or controlled from any source by the user through the service. The user could also grant to other users of the service various levels of permission on either a permanent or temporary basis. Such permissions could include monitoring, configuring, reconfiguring or even transfer.

Figure 6:
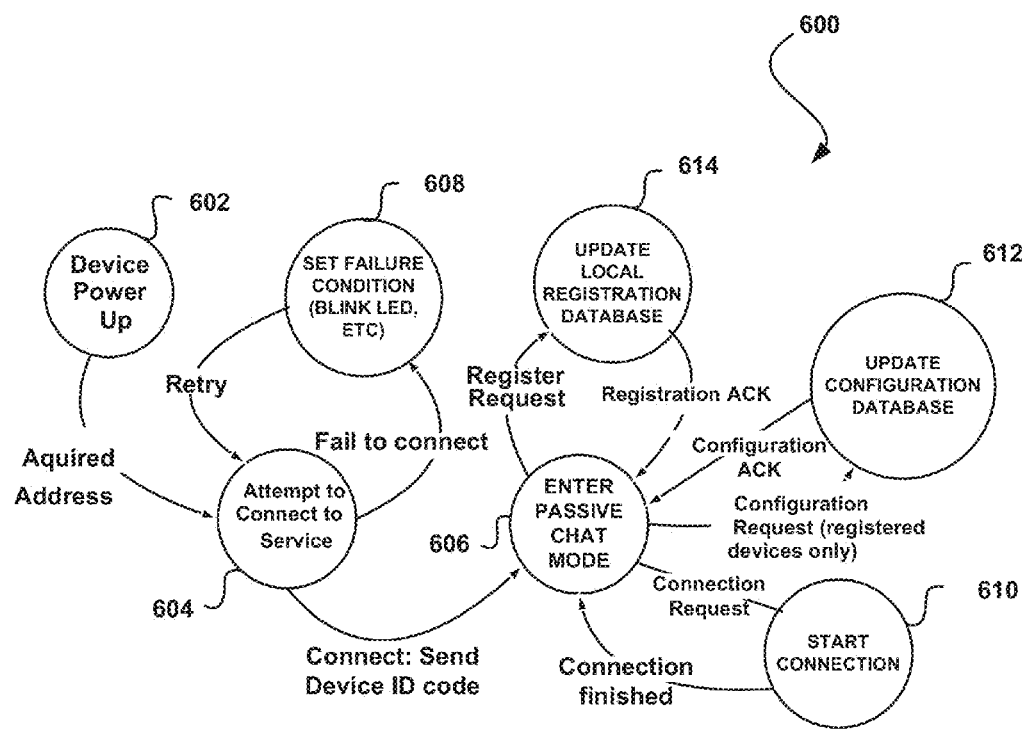
FIG. 6 illustrates an automatic identification method, in accordance with another embodiment.

FIG. 6 illustrates an automatic identification method 600, in accordance with another embodiment. As an option, the method 600 may be implemented in the context of the architecture and environment of FIGS. 1-5. Of course, however, the method 600 may be carried out in any desired environment. It should also be noted that the aforementioned definitions may apply during the present description.

As shown, an un-configured device may power on and attempt to use an automated network service to acquire a configuration resource from a network server (e.g. a DHCP server, etc.). See operation 602. Once the resource is acquired, the device may attempt to connect to a service. See operation 604. If the connection is successful the device may enter a service chat mode (e.g. passive chat mode). See operation 606. Moreover, the device may await a command from the service provider.

If the device is unable to acquire a network resource from the network server, the device may signify to the user via an indicator that the device has failed to acquire a resource. The device may then continue to acquire the network resource unless directed otherwise by the user. If the device is unable to connect to the service, the device may signify to the user via an indicator that the device has failed to connect to the service. The device may then continue attempting to connect to the service unless directed otherwise by the user. See operation 608.

Once the device has connected to the service, the device may signify to the user via an indicator that it has connected to the service. The device may then await further commands from the service. See operation 610. Upon receiving instructions from the service, the device may update its internal database with identifying information.

For example, the device may update information associated with its configuration. See operation 612. Additionally, a local registration database may be updated. See operation 614. In addition, the device may await further commands from the service.

Figure 7:
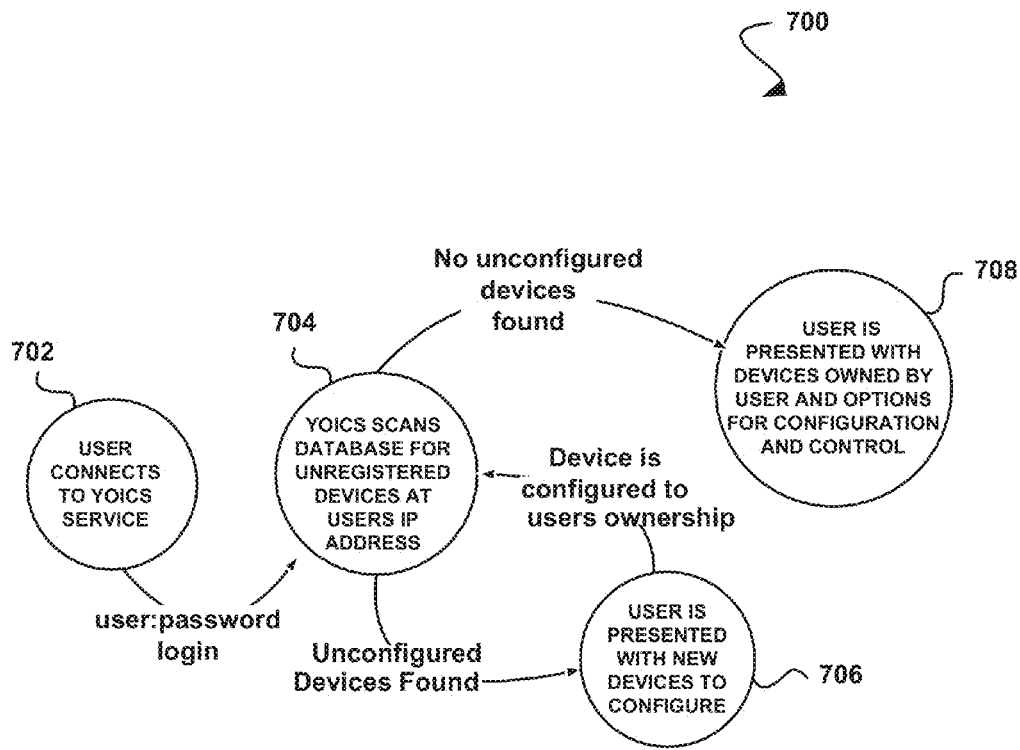
FIG. 7 illustrates an automatic identification method, in accordance with another embodiment.

FIG. 7 illustrates an automatic identification method 700, in accordance with another embodiment. As an option, the method 700 may be implemented in the context of the architecture and environment of FIGS. 1-6. Of course, however, the method 700 may be carried out in any desired environment. It should also be noted that the aforementioned definitions may apply during the present description.

As shown, a user may log into a service with an associated identifier (e.g. ID, username, etc.) and password. See operation 702. In other words, the service may provide access to the user based on the associated identifier. The service may then check for any un-configured devices from the users IP address that have contacted the service. See operation 704. If any un-configured device exists, such device may be displayed to the user. See operation 706. The same flow would follow for a pre-configured device, where during the discovery phase, the service (e.g. YOICS service) would scan for unregistered devices. Upon discovery of a registered device, where manufacturer and device type may be used as further filters, that device is presented to the user for confirmation. Upon registration by the user, a mechanism could be in place to allow device ownership transfer or simply to provide sharable access.

The user may optionally select to configure the device. If the user selects to configure the device, then the device may be configured as being associated with the user. In this way, the user may be allowed to configure and control the device.

If no un-configured device exists, the user is presented with devices owned by the user and options for configuration and control. See operation 708. It should be noted that once a device is configured and associated with a service ID, the device may be removed from a network associated with the user and plugged into another network where the associated service ID may still be able to control it. This may therefore allow users to configure devices and retain ownership and control of such devices once deployed.

Figure 8:
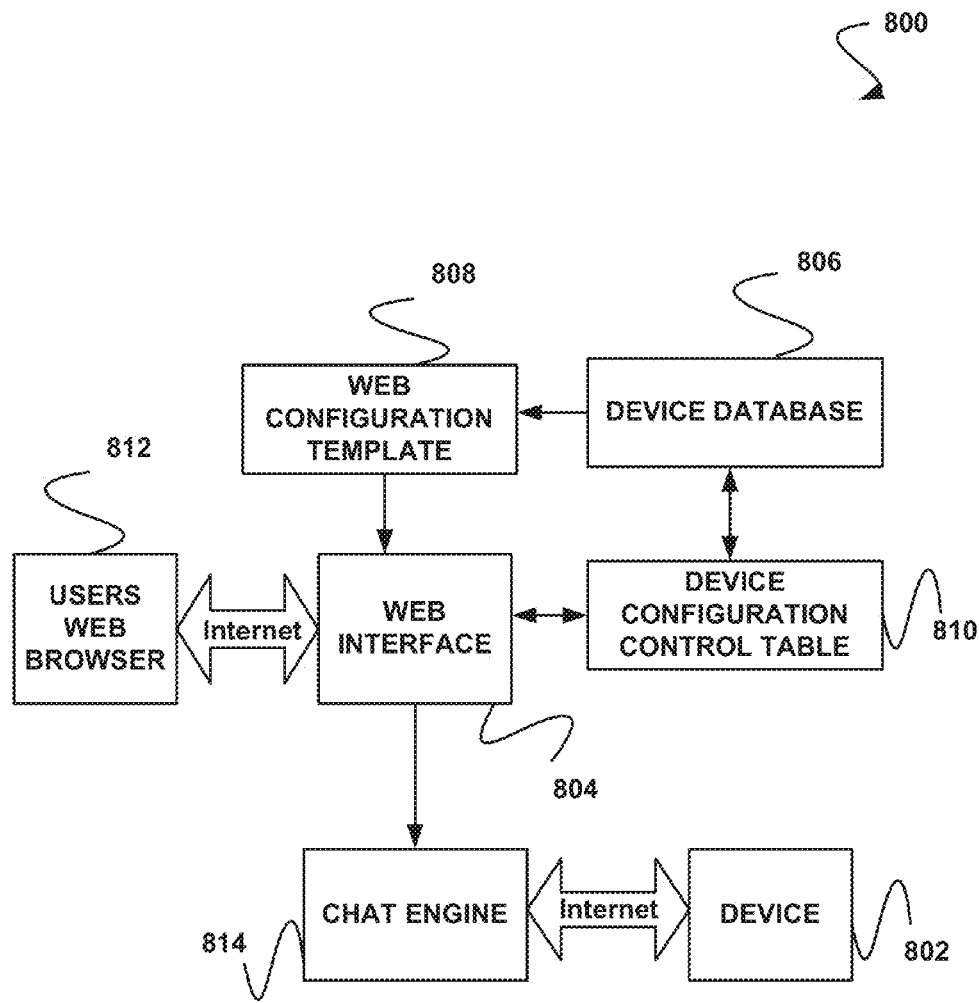
FIG. 8 illustrates an abstracted device configuration, in accordance with another embodiment.

FIG. 8 illustrates an abstracted device configuration 800, in accordance with another embodiment. As an option, the abstracted device configuration 800 may be implemented in the context of the architecture and environment of FIGS. 1-7. Of course, however, the abstracted device configuration 800 may be implemented in any desired environment. It should also be noted that the aforementioned definitions may apply during the present description.

In the present exemplary embodiment, a device 802 may be configured through a service. Each class of devices may be associated with a first set of configurable options. The first set of configurable options may be stored in a local device database 806 associated with each device 802.

In addition, each class of devices may be associated with a second set of options. The second set of options may be stored in a service database. It should be noted that, the device 802 may not be configurable. In this way, a need for a device user interface and its associated network infrastructure may be alleviated, thus possibly lowering the complexity and cost of the device 802.

The service may be able to control and configure the device 802 through a simple device protocol that runs in conjunction with a chat protocol 814 associated with the service. A user interface for the device configuration may be implemented through the service and may be scriptable to allow the addition of many classes of devices. Such classes of devices may be created and supported by the service and/or created and supported by a partner of the service.

Utilizing a web interface 804, a user may select a device 802 to configure (e.g. utilizing a web browser 812). The device 802 may be looked up in the device database 806. Moreover, the chat engine 814 may query the device 802 for the current configuration.

A corresponding web configuration interface template 808 for the selected device 802 may be populated with the current device configuration and may then be displayed to the user. Such web configuration interface template 808 for the selected device 802 may be populated using a device configuration control table 810, for example. The user may customize the device configuration and the chat engine 814 may make the desired customization to the device 802. The configuration may then be re-read, and displayed once again to the user to verify that the changes are correct. As an option, device classes may have different web interface "skins" depending on which service ID or device properties are configured.

Figure 9:
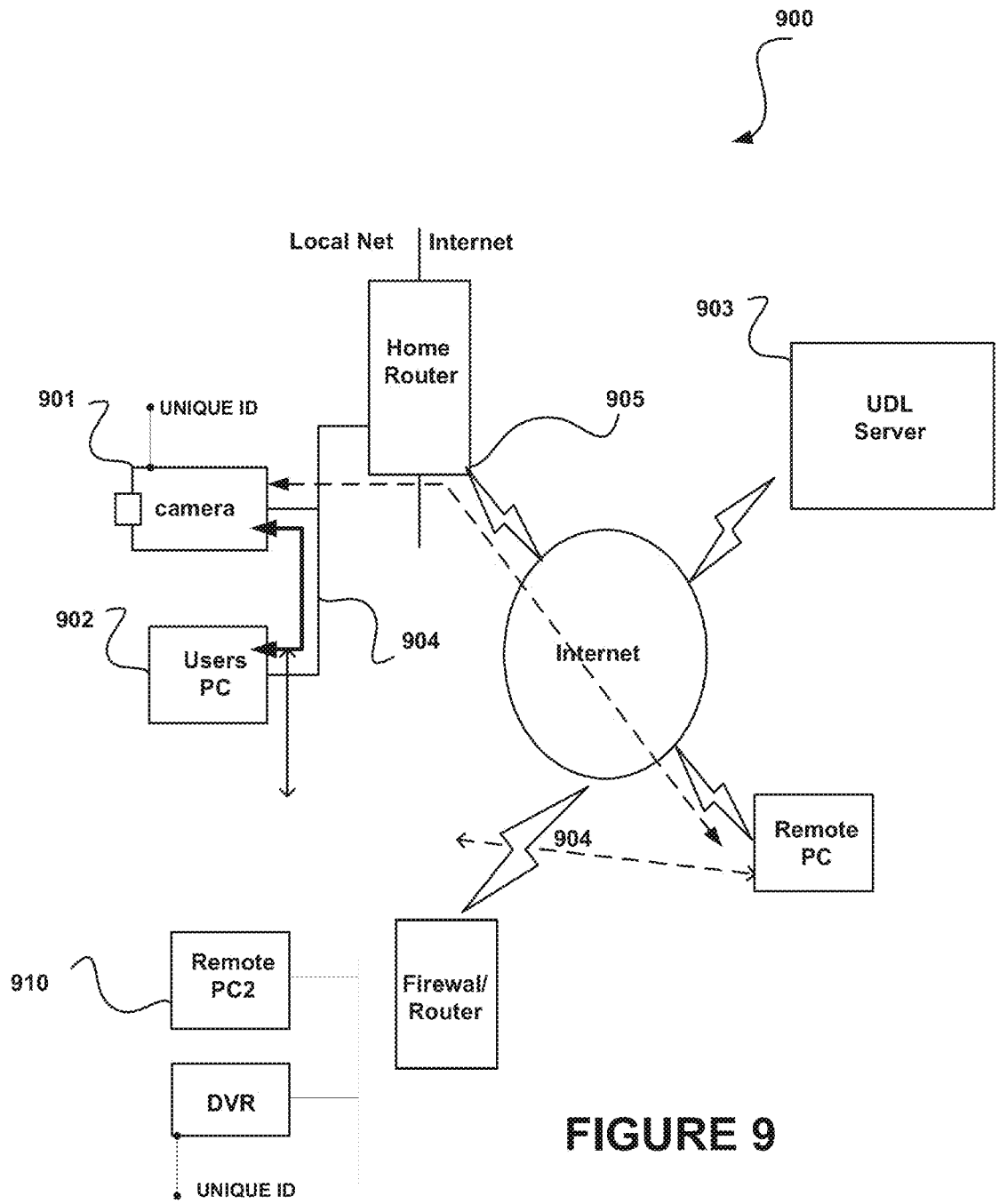
FIG. 9 illustrates a system for establishing a peer-to-peer connection between devices on a network, in accordance with another embodiment.

FIG. 9 illustrates a system 900 for establishing a peer-to-peer connection between devices on a network, in accordance with another embodiment. As an option, the system 900 may be implemented in the context of the architecture and environment of FIGS. 1-8. Of course, however, the system 900 may be implemented out in any desired environment. It should also be noted that the aforementioned definitions may apply during the present description.

As shown, associated devices and User IDs may be utilized to establish a direct peer-to-peer network connection between a remote device and another device, where the other device is utilized by a user for logging in to a service allowing access to the remote device. The direct connection between the two devices may ensure efficient topology, particularly where both devices are located within the same local area network (LAN).

The service may be used to facilitate the remote devices and/or users connecting based on their associated User IDs, UDLs and/or UNIQUE IDs, along with the associated permissions and/or delegations configured on the service and/or device or specified by the users. For example, where the devices are remotely located on the Internet, the service may track the location of the devices, the users and their associated User IDs, UDLs and/or UNIQUE IDs (i.e., the users' internet IP and port addresses used by the user/device from the device/user perspective and the perspective of the internet service).

This information may allow the remote devices to be informed, for example, when the service attempts to create a session between such remote devices (and/or between one or more other remote devices) using the information passed to the devices from the service. The information may include addressing information, encryption keys, access rights, and/or any other information capable of being utilized in the creation and operation of the connection between the remote devices and/or users of the service. As an option, any part of the communications (e.g. between the devices and/or between the devices and the service) may be encrypted and/or authenticated using cryptographic hashes and/or encryption functions.

As specifically shown, a camera 901 and/or user (via a PC 902) may communicate with a service server 903 via standard Internet Protocols (e.g. TCP, UDP, and/or other internet protocol) and may transmit to the service server 903 (i.e. UDL server) its local address and port from the local network 904, its associated UNIQUE ID, authentication information and/or any other information associated therewith. The service server 903 may store the received information along with a perceived Internet address and communication port for the device/user (e.g. as determined by the service server 903). With this information, the service server 903 may determine if it will acknowledge the device (e.g. the camera 901) of its enrollment (e.g. registered status, etc.) and/or give the device further instructions. In this way, the camera 901 and/or user may register with the service server 903.

Once the camera 901 and/or user are registered with the service server 903, connections created between such devices (i.e., the camera 901 and the user's PC 902) may be facilitated by the service server 903. In one embodiment, a remote user via a PC 910 may request access to the camera 901, and the service server 903 may determine if the remote user has access rights to connect to the camera 901. If the remote user has such access rights, the service server 903 may send a connect message to both the camera 901 and the requesting user.

The connect message may contain various information related to internet addresses and ports, encryption and authentication keys, access rights and/or other session information used to create a connection between the two peer devices (i.e. the camera 901 and the user's PC 910). Using this information, packets may be sent to the requested addresses specified in the connect message in an attempt to create a direct connection between the devices using Internet protocols (e.g. user datagram protocol (UDP), transmission control protocol (TCP) and/or any other internet protocol, etc.). If a direct connection is unable to be established, an indirect connection via the service server 903 (or possibly any other well connected Internet device or server) may optionally be established. Once a peer connection has been established between various devices, a session may be generated and any type of data may be sent over the connection.

Once devices are connected via a session, multiple separate data and/or control connections (referred to as tunnels) may be established between the devices utilizing the session. These tunnels may directly map other Internet protocols [e.g. UDP, TCP, internet control message protocol (ICMP), etc.], or may also map custom information and protocols. Such protocols may be defined in a tunnel connection negotiation message, and/or in any other manner that may optionally be dependent on the session set-up or the device type. Each session may contain a single tunnel, but of course may also utilize any number of different types of tunnels.

Figure 10:
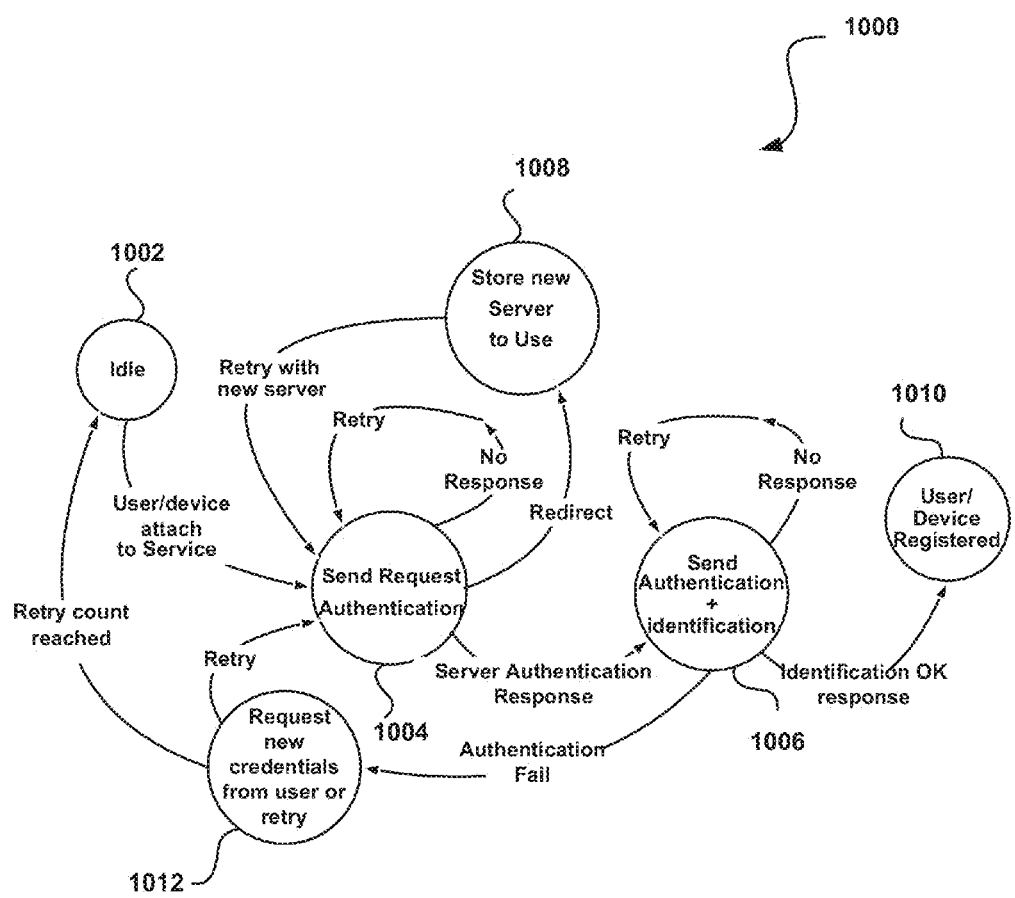
FIG. 10 illustrates a method for registering a device with a service server, in accordance with another embodiment.

FIG. 10 illustrates a method 1000 for registering a device with a service server, in accordance with another embodiment. As an option, the method 1000 may be implemented in the context of the architecture and environment of FIGS. 1-9. Of course, however, the method 1000 may be carried out in any desired environment. It should also be noted that the aforementioned definitions may apply during the present description.

As shown, an idle user/device is attached to a service. See operation 1002. As a result, a request authorization is sent to a server. See operation 1004. If a server authentication response is received, authentication and identification information is sent. See operation 1006.

In the case that the request authentication is redirected, a new server is stored to use. See operation 1008. Another request authentication ma be sent to this new server. Once authentication and identification information is sent, it is determined whether the authentication/identification passes or fails. If the authentication/identification passes, the user/device is registered. See operation 1010. If the authentication/identification fails, new credentials are requested from the user. See operation 1012. As shown, if a retry count or a number of attempts threshold is reached, the user/device is set back to idle.

Figure 11:
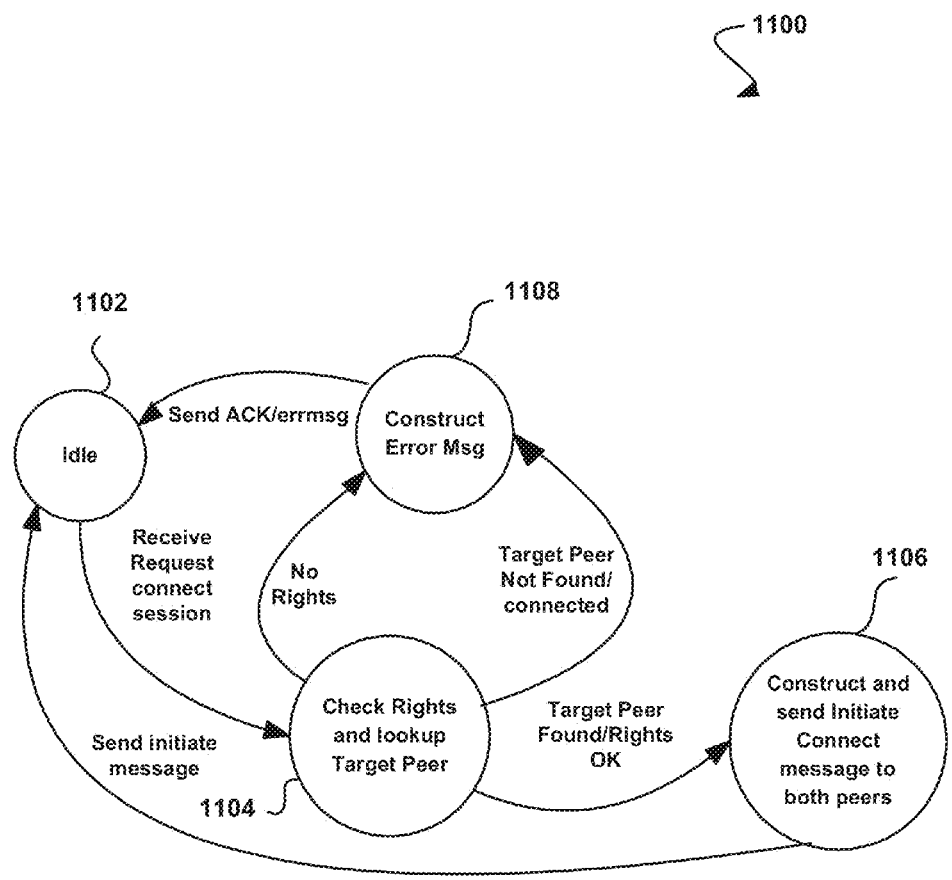
FIG. 11 illustrates a method for allowing a connection between devices utilizing a service server, in accordance with another embodiment.

FIG. 11 illustrates a method 1100 for allowing a connection between devices utilizing a service server, in accordance with another embodiment. As an option, the method 1100 may be implemented in the context of the architecture and environment of FIGS. 1-10. Of course, however, the method 1100 may be carried out in any desired environment. It should also be noted that the aforementioned definitions may apply during the present description.

As shown, a request is received to connect to a session while in an idle mode. See operation 1102. As a result, rights are checked and a search for a target peer is initiated. See operation 1104. If a target peer is found and the rights are validated, an initiate connect message is constructed and initiated to both peers. See operation 1106. If a target peer is not found and/or the rights are not validated, an error message is constructed. See operation 1108.

Figure 12:
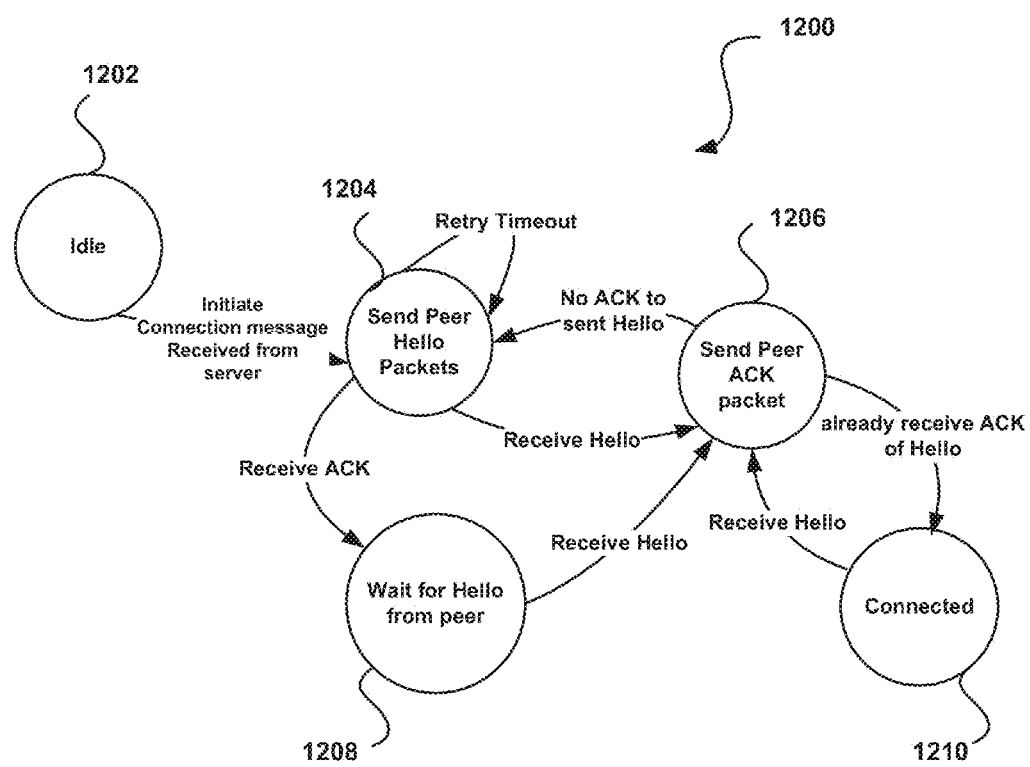
FIG. 12 illustrates a method for generating a session between peer devices, in accordance with another embodiment.

FIG. 12 illustrates a method 1200 for generating a session between peer devices, in accordance with another embodiment. As an option, the method 1200 may be implemented in the context of the architecture and environment of FIGS. 1-11. Of course, however, the method 1200 may be carried out in any desired environment. It should also be noted that the aforementioned definitions may apply during the present description.

As shown, an idle system receives an initiate connection message from a server. See operation 1202. Peer "hello packets" are then sent. See operation 1204. If the "hello packet" is received, a peer acknowledgement (ACK) packet is sent. See operation 1206 and operation 1208. Once the ACK, packet is sent, and the "hello packet" is received, a connection is made. See operation 1210.

Figure 13:
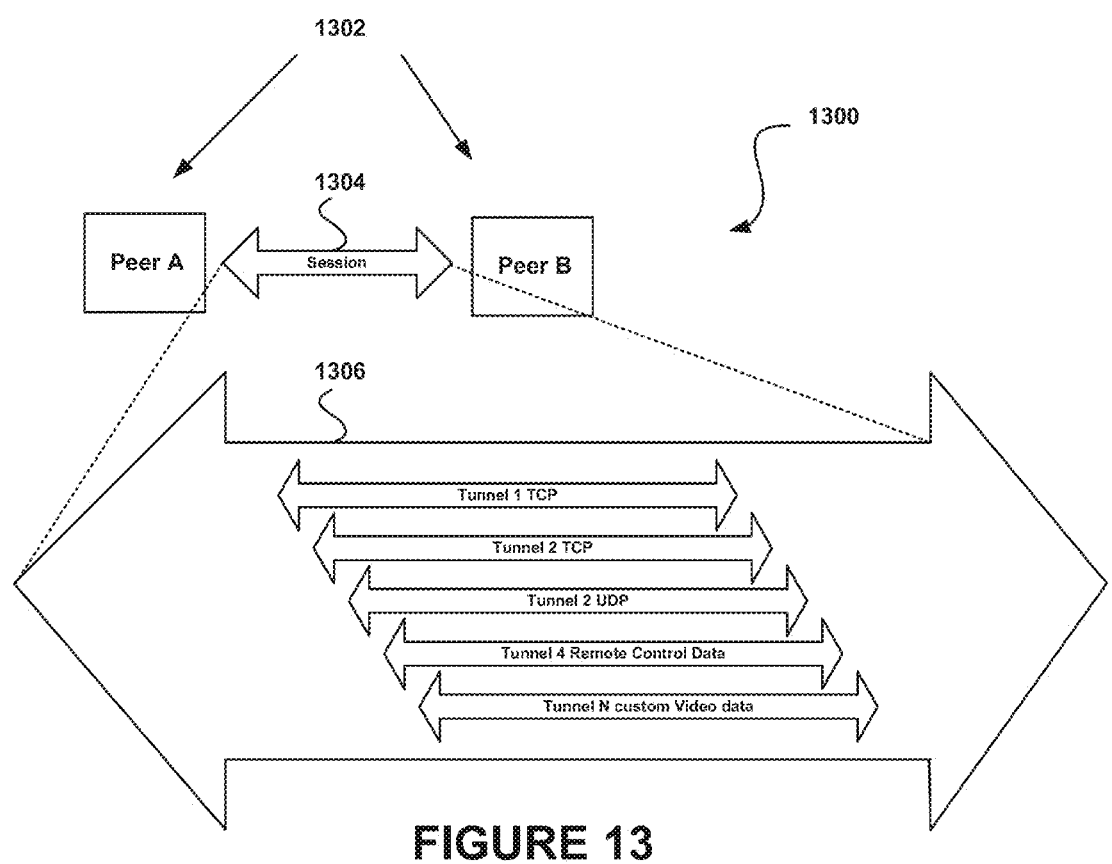
FIG. 13 illustrates a session containing different types of tunnels, in accordance with another embodiment.

FIG. 13 illustrates a session 1300 containing different types of tunnels, in accordance with another embodiment. As an option, the session 1300 may be viewed in the context of the architecture and environment of FIGS. 1-12. Of course, however, the session 1300 may be viewed in the context of any desired environment. It should also be noted that the aforementioned definitions may apply during the present description.

As shown, once devices 1302 are connected via a session 1304, multiple separate data and/or control connections 1306 (referred to as tunnels) may be established between the devices utilizing the session. These tunnels 1306 may directly map other Internet protocols [e.g. UDP, TCP, internet control message protocol (ICMP), etc.], or may also map custom information and protocols. Such protocols may be defined in a tunnel connection negotiation message, and/or in any other manner that may optionally be dependent on the session set-up or the device type. Each session may contain a single tunnel, but of course may also utilize any number of different types of tunnels as show in FIG. 13.

Figure 14:
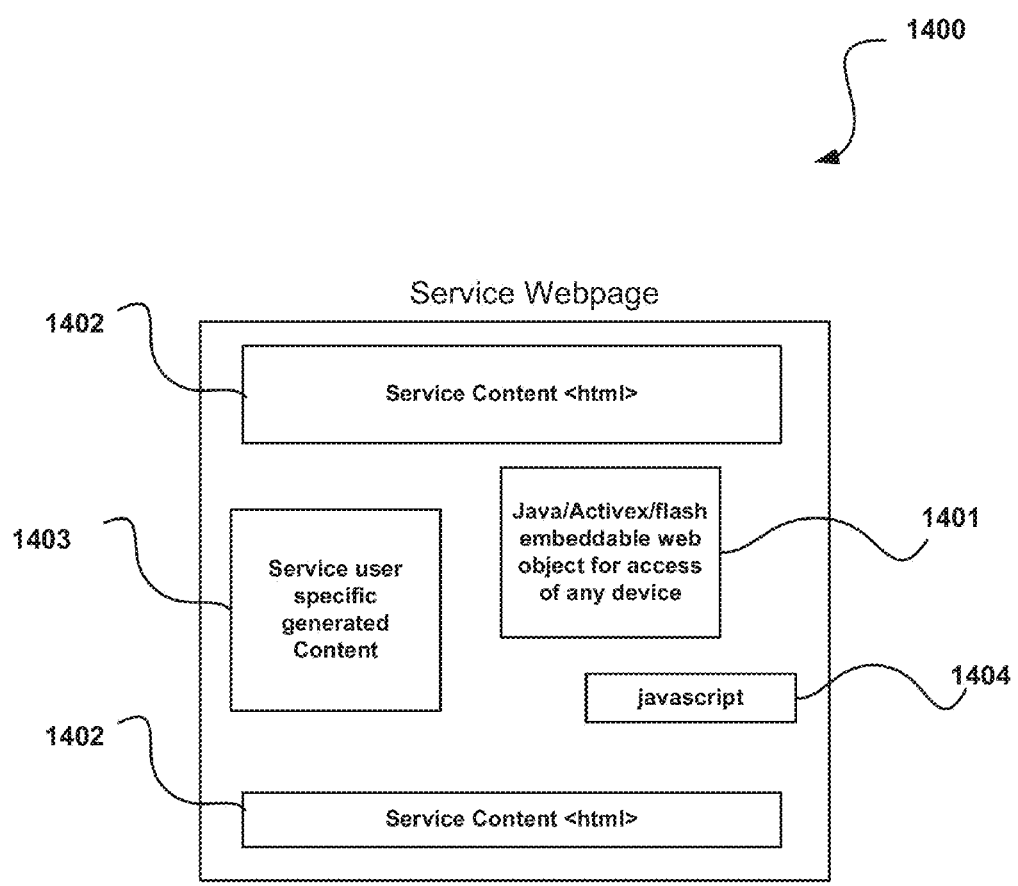
FIG. 14 illustrates a service webpage for remotely accessing a device over a network, in accordance with another embodiment.

FIG. 14 illustrates a service webpage 1400 for remotely accessing a device over a network, in accordance with another embodiment. As an option, the service webpage 1400 may be implemented in the context of the architecture and environment of FIGS. 1-13. Of course, however, the service webpage 1400 may be implemented in any desired environment. It should also be noted that the aforementioned definitions may apply during the present description.

As an option, service access software utilized for remotely accessing a device over a network may be distributed via web-embeddable software code 1401 using Java, Active-X, Flash, and/or any other browser embeddable code. In addition, machine installable software programs, machine embedded software and/or any other types of software configurations may be utilized for distributing the service access software via the web-embeddable software code 1401. The embeddable software code 1401 may be inserted with other web-base object code, such as static HTML content 1402, dynamic HTML content 1403, java script 1404 and/or any other type of web-servable content in any order or form.

Thus, a user of the service may be allowed to access an associated account and devices via the web-embedded code, thus preventing the need to download and install software for obtaining such access. This may be useful for accessing service enabled devices and users from remote places such as Internet cafés and other public locations where downloading and installing applications is not possible.

Figure 15:
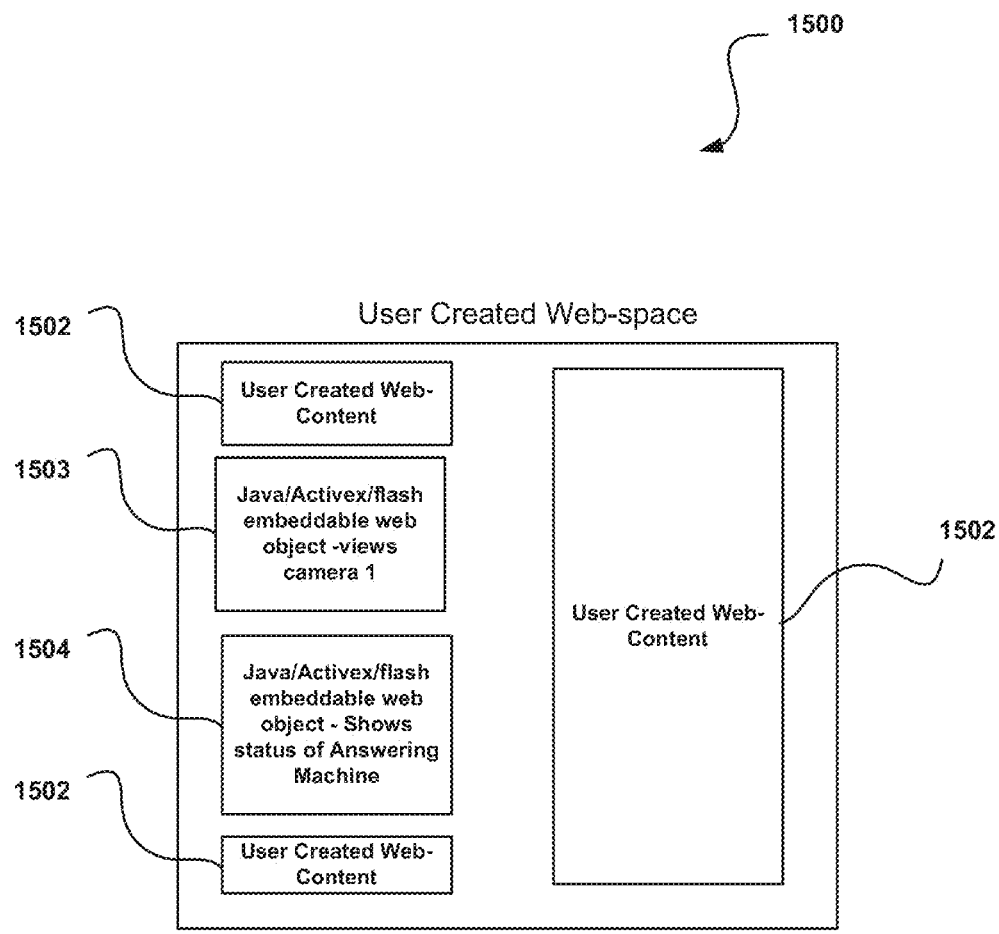
FIG. 15 illustrates a user-created web space for remotely accessing a device over a network, in accordance with another embodiment.

FIG. 15 illustrates a user-created web space 1500 for remotely accessing a device over a network, in accordance with another embodiment. As an option, the service webpage 1500 may be implemented in the context of the architecture and environment of FIGS. 1-14. Of course, however, the service webpage 1500 may be implemented in any desired environment. It should also be noted that the aforementioned definitions may apply during the present description.

As shown, embeddable code may allow public or private access to user devices from user-created web space 1500. In various embodiments, the user created web-space 1500 may include web content hosted on web servers, online personal spaces (e.g. myspace.com®, Facebook, etc.), any user created web content 1502, embeddable web object (e.g. embeddable web objects 1503 and 1504), etc. The web embeddable code may be sourced from the user's website, the services website and/or third party website. Thus, direct access to devices, such as web-cameras 1503, may be allowed and/or access or status information associated with devices (e.g. answering machines 1504) may be received without the need for static IP addresses, dynamic IP resolving services, redirection servers, firewall port forwarding, and/or any other consumer configuration that may otherwise prevent such access. It should be noted that the user content and the embeddable code may be formatted in any desired manner, and is therefore not limited to user-created web space 1500 shown.

Figure 16:
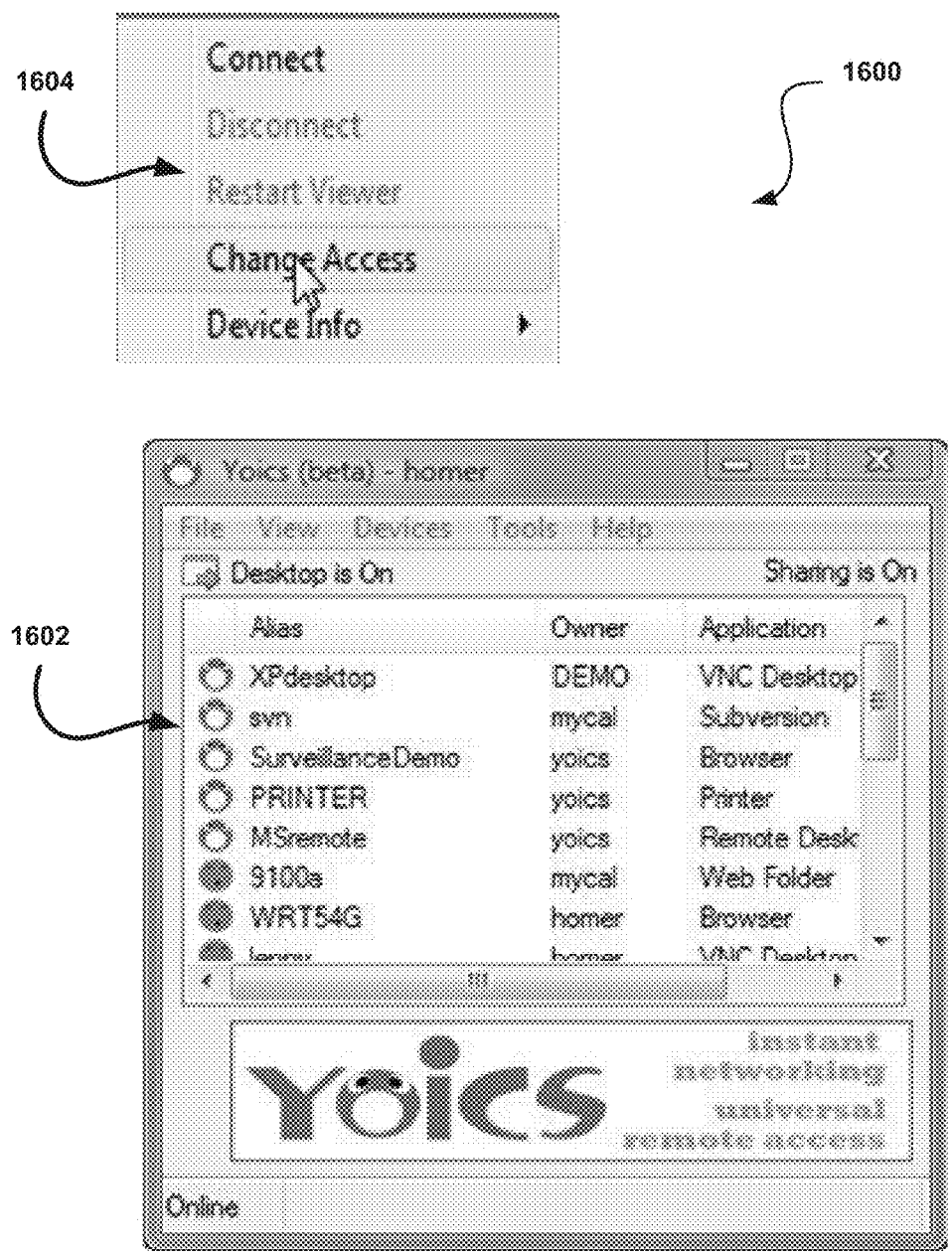
FIG. 16 illustrates a web space for remotely accessing a device over a network, in accordance with another embodiment.

FIG. 16 illustrates a web space 1600 for remotely accessing a device over a network, in accordance with another embodiment. As an option, the web space 1600 may be implemented in the context of the architecture and environment of FIGS. 1-15. Of course, however, the web space 1600 may be implemented in any desired environment. It should also be noted that the aforementioned definitions may apply during the present description.

As shown, remote access to a plurality of network devices and services 1602 is provided. For example, the web space 1600 may provide access to a network printer, a configuration screen for a router, or any dedicated network device or a TCP/IP service running on a system. Additionally, such devices and services may be transformed into a remote accessible and shareable Internet resource without having to modify a firewall of the system.

In one embodiment, right clicking a mouse corresponding with the system will display a window 1604 which may allow a user to access devices on a network. The window 1604 may allow the user to connect to a device, disconnect from a device, restart the web space 1600 and refresh the plurality of network devices and services 1602, change access to a device, configure parameters on a device, and/or various other functions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   associating a universal device locator (UDL) with a unique identifier of a device connected to a network;
   identifying the UDL on the network; and
   accessing the device utilizing the UDL;
   wherein the association between the UDL and the unique identifier of the device is specific to a first user that is an owner of the device, and wherein a transfer of ownership of the device to a second user is made by changing the association of the unique identifier of the device from being with the UDL to being with another UDL associated with the second user;
   wherein the changing the association of the unique identifier of the device from being with the UDL to being with another UDL associated with the second user is utilized as a trigger for a commerce transaction.

2. The method of claim 1, wherein the UDL is provided by a service on the network.

3. The method of claim 2, wherein the UDL represents an entity separate from the device that is provided by the service.

4. The method of claim 2, wherein the service utilizes the UDL to access the device.

5. The method of claim 4, wherein accessing the device utilizing the UDL includes:
   logging into the service,
   after logging into the service, utilizing the UDL to identify the device and any other devices associated with the UDL.

6. The method of claim 5, wherein accessing the device utilizing the UDL further includes:
   after identifying the device, automatically updating at least the device.

7. The method of claim 4, wherein the service is allowed to utilize the UDL to access the device when a selection is received from the owner of the device to make the UDL searchable via the service.

8. The method of claim 1, wherein accessing the device utilizing the UDL includes utilizing a derivative of the UDL to access the device.

9. The method of claim 1, further comprising utilizing the UDL to establish a direct peer-to-peer network between the device and a remote device.

10. The method of claim 1, wherein the device is associated with a plurality of UDLs by associating each of the UDLs with the unique identifier of the device.

11. The method of claim 10, wherein one of the plurality of UDLs is a master UDL.

12. The method of claim 11, wherein the master UDL is predetermined.

13. The method of claim 11, wherein the master UDL designates permissions for each of the plurality of UDLs.

14. The method of claim 10, wherein each of the UDLs is designated as having authority over particular capabilities of the device.

15. The method of claim 1, wherein the association between the UDL and the unique identifier of the device is stored in memory of a UDL server.

16. The method of claim 1, wherein the association between the UDL and the unique identifier of the device is used for configuring the device for the first user.

* * * * *